June 3, 1924.  1,496,627

H. McG. COLBATH ET AL

LAWN SPRINKLER

Filed April 18, 1922   2 Sheets-Sheet 1

Inventors-
Howard McG. Colbath.
LeRoy Gilbert.
by their Attorneys-
Howson & Howson

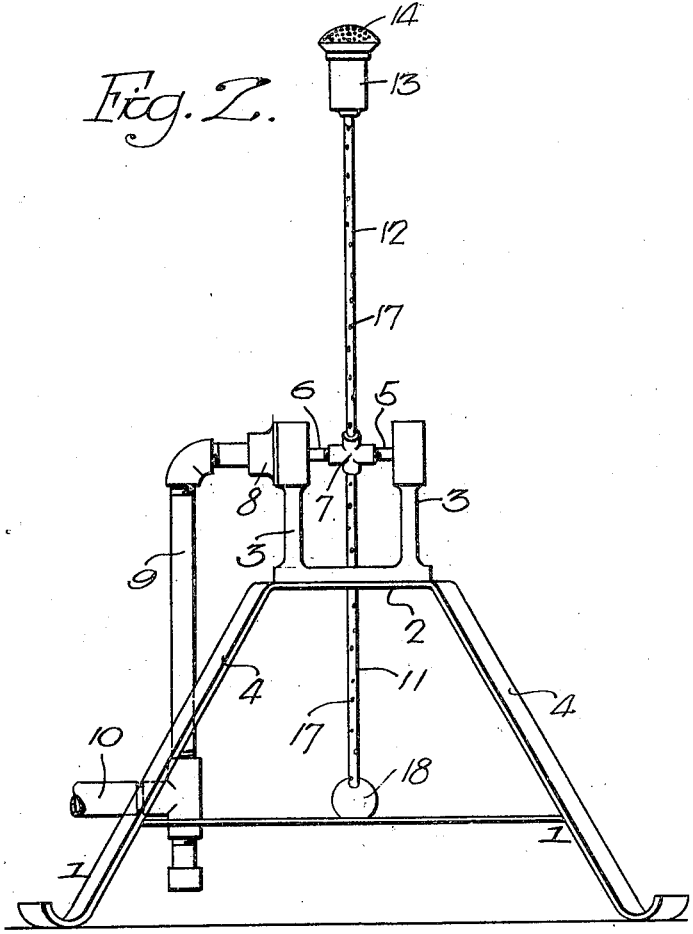
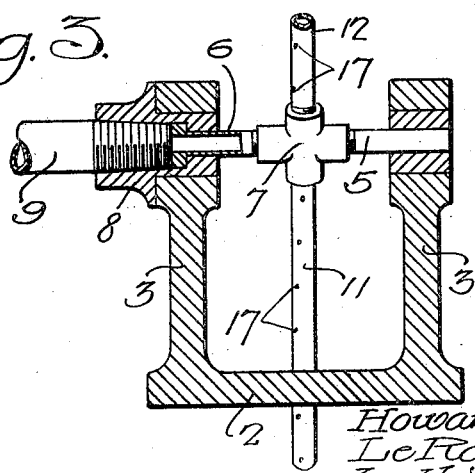

Patented June 3, 1924.

1,496,627

UNITED STATES PATENT OFFICE.

HOWARD McG. COLBATH AND LEROY GILBERT, OF ATLANTIC CITY, NEW JERSEY.

LAWN SPRINKLER.

Application filed April 18, 1922. Serial No. 554,410.

*To all whom it may concern:*

Be it known that we, HOWARD McG. COLBATH and LEROY GILBERT, citizens of the United States, residing in Atlantic City, New Jersey, have invented Lawn Sprinklers, of which the following is a specification.

One object of this invention is to provide a relatively simple, inexpensive device for delivering water in fine streams or jets over relatively extended areas, and the invention more especially has to do with such a combination of parts as will be capable of operation for prolonged periods of time with a minimum of attention.

It is further desired to provide a lawn sprinkler which shall include an automatically movable element whereby water in finely divided form shall be intermittently delivered to different portions of a relatively extensive area, the arrangement being such that washing or erosive action of the water on the lawn or other surface to which it is applied, shall be effectually prevented.

Another object of our invention is to provide a novel form of automatically operating, water-distributing device which shall be inexpensive to construct and operate, which shall be conveniently portable, and capable, of efficiently distributing the water in finely divided form over a predetermined area.

Figure 1:
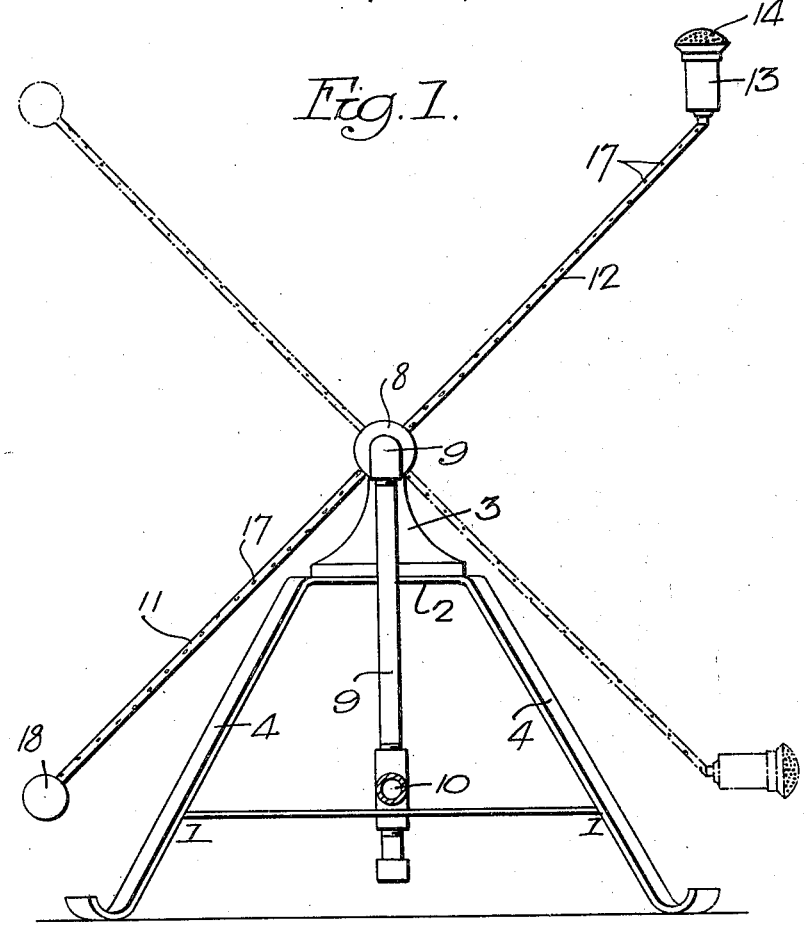
Figure 4:
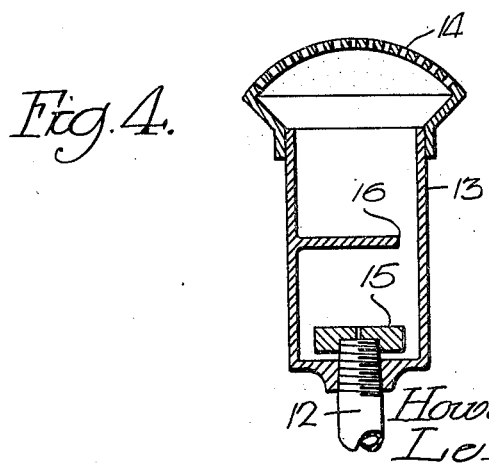

These object and other advantageous ends we attain as hereinafter set forth, reference being had to the accompanying drawings, in which, Figs. 1 and 2 are respectively a side and an end elevation of a lawn sprinkler constructed in accordance with our invention;

Fig. 3 is an enlarged vertical section taken through the supporting bearings for the oscillatory member; and Fig. 4 is an enlarged vertical section of the water-receiving cup forming part of our device.

In the above drawings 1 represents any suitable form of supporting frame or structure upon which our device is mounted. This structure in the present instance consists of a base plate 2 carried by outwardly inclined and suitably braced legs 4. Mounted upon and fixed to the base plate 2 is a bearing yoke 3 having substantially parallel, upwardly extending arms in which is journalled a shaft including or made up of a solid spindle portion 5, a tubular portion 6 and a T fitting 7 connecting said portions.

The tubular portion of the shaft is flanged within a suitable bushing 8 fixed in one arm of the yoke 3 and having threaded into it a water supply pipe 9 extended downwardly and terminating in any desired form of fitting for the reception of a hose pipe 10 or other water supplying conduit. Water delivered through said conduit and pipe 9 is thus free to pass through the tubular portion 6 of the shaft and into the T fitting 7. The latter has connected to two of its branches at right angles to said shaft a pair of tubular arms 11 and 12 extending in the case illustrated in the same straight line.

The latter of these arms terminates in or has connected to its outer end a cup or container 13 preferably including a perforated cover 14 and projecting in a line at an angle to the line of said arm 12, so that when this occupies one of its extreme positions, as indicated in dotted lines in Fig. 1, the cup is brought into such a position as will insure the discharge of all of its contents, while when in its other extreme position said cup is in an upright position in which it will retain a maximum of liquid.

The end of the tubular arm 12 is preferably formed with an outlet nozzle 15 inside of the cup to materially limit the rate at which water can flow into the same, and in order to prevent the forcible delivery of water from said nozzle 15 to or through the openings in the cover 14, we provide in the cup a transverse baffle plate 16 in the line of the opening in said nozzle. The arm 12, as well as the arm 11, is provided with any suitably formed water discharge openings 17 preferably arranged in one or more helical lines extending from one end of each of said arms to the other. These openings are obviously relatively small so that when water is supplied to the device through the pipe 10, it will be discharged from them in fine and relatively forcible streams.

On the free end of the arm 11 we mount a weight 18 closing said end and of such mass that its weight plus that of the arm 11 will overbalance the weight of the arm 12 with the cup 13 as long as the latter is empty, but will be overbalanced by the weight of said cup and its arm when the cup is full of water.

With this described arrangement of parts, before water is supplied to the device, the arms 11 and 12 with the weight 18 and cup 13 will occupy the positions shown in full lines in Fig. 1. If now water under pressure be supplied through the pipes 10 and 9, it will enter the arms 11 and 12 and be delivered from the openings 17 thereof in fine streams discharged into different parts of a relatively extended, substantially rectangular area. At the same time water will flow through the orifice of the nozzle 15 into the cup 13 and this flow will continue until said cup is substantially filled. The arms 11 and 12 with the shaft 5—7—6 will thereupon turn from the position shown in full lines in Fig. 1, to the position shown in dotted lines, whereupon the water in the cup will be more or less gradually delivered therefrom through the openings in its cover. When practically empty the arm with the cup will automatically be returned to the position shown in full lines, under the action of the weight 18, whereupon the above cycle of operations will be repeated as long as water is supplied.

It will be understood that without departing from our invention, the weight 18 may be omitted and the weight of the arm 11 be so proportioned with regard to that of the cup 13 and arm 12 as to overbalance the same when the cup is empty and be overbalanced when the cup is full. By providing the perforated cover 14 we not only reduce the speed of operation of the device, but prevent possible damage to the lawn or other surface from the water discharged by the cup.

It will be noted further that the device is operative without valves of any kind and is of such a nature that there is little if any likelihood of any part getting out of order or failing to function in the desired manner. The water pressure in the pipe 9 acting against the flange of the tubular shaft section 6 insures a substantially liquid tight joint between said flange and the bushing 8 without causing an abnormal amount of frictional resistance to the movement of the sprinkler arms 11 and 12. Each of the jets of water is distributed over a considerable area overlapping or immediately adjacent to that supplied from one or more of the other jets, and inasmuch as the positions of the various jets are periodically changed as the arms are swung, there is no danger of damage by washing. If the jets are made sufficiently small the water is supplied in finely divided form in which it can be best utilized.

We claim:

1. The combination in a lawn sprinkler of a supporting structure; a perforated tubular arm mounted thereon to oscillate on a substantially horizontal axis; a weight on one branch of said arm; an open top cup connected to the passage of the other branch of the arm and movable therewith from a position in which it retains water to a position in which said water is discharged through its top opening; with means for supplying water under pressure to the arm and to said container to cause the arm to oscillate.

2. The combination of a supporting structure; a tubular arm having outlet openings and mounted to oscillate on said structure; means for supplying water under pressure to the arm; and a cup carried by the arm in a position to retain water in one position thereof and discharge water in another position; with a baffle in the cup for preventing the direct flow therethrough of water delivered thereto from the arm.

3. The combination of a supporting structure; a tubular arm having outlet openings and mounted to oscillate on said structure; means for supplying water under pressure to the arm; a cup carried by the arm in a position to receive and retain water in one position thereof and discharge water in another position; a perforated cover for the cup; and a deflector for preventing direct passage of water from the arm through the cup onto the cover thereof.

4. The combination in a supporting structure; a tubular spindle mounted in bearings on said structure; a tubular arm having branches extending in opposite directions from said spindle and formed with lines of perforations; means for supplying water under pressure to the arm through the spindle; and means for causing automatic oscillation of the spindle with the arm, including a weight on one branch of the arm and a cup on the other branch thereof, said cup being mounted to retain water in one position of the arm and discharge it in another position.

HOWARD McG. COLBATH.
LEROY GILBERT.